June 5, 1962     E. MOORE     3,037,543
TIRE CHAIN ASSEMBLIES
Filed Jan. 10, 1961
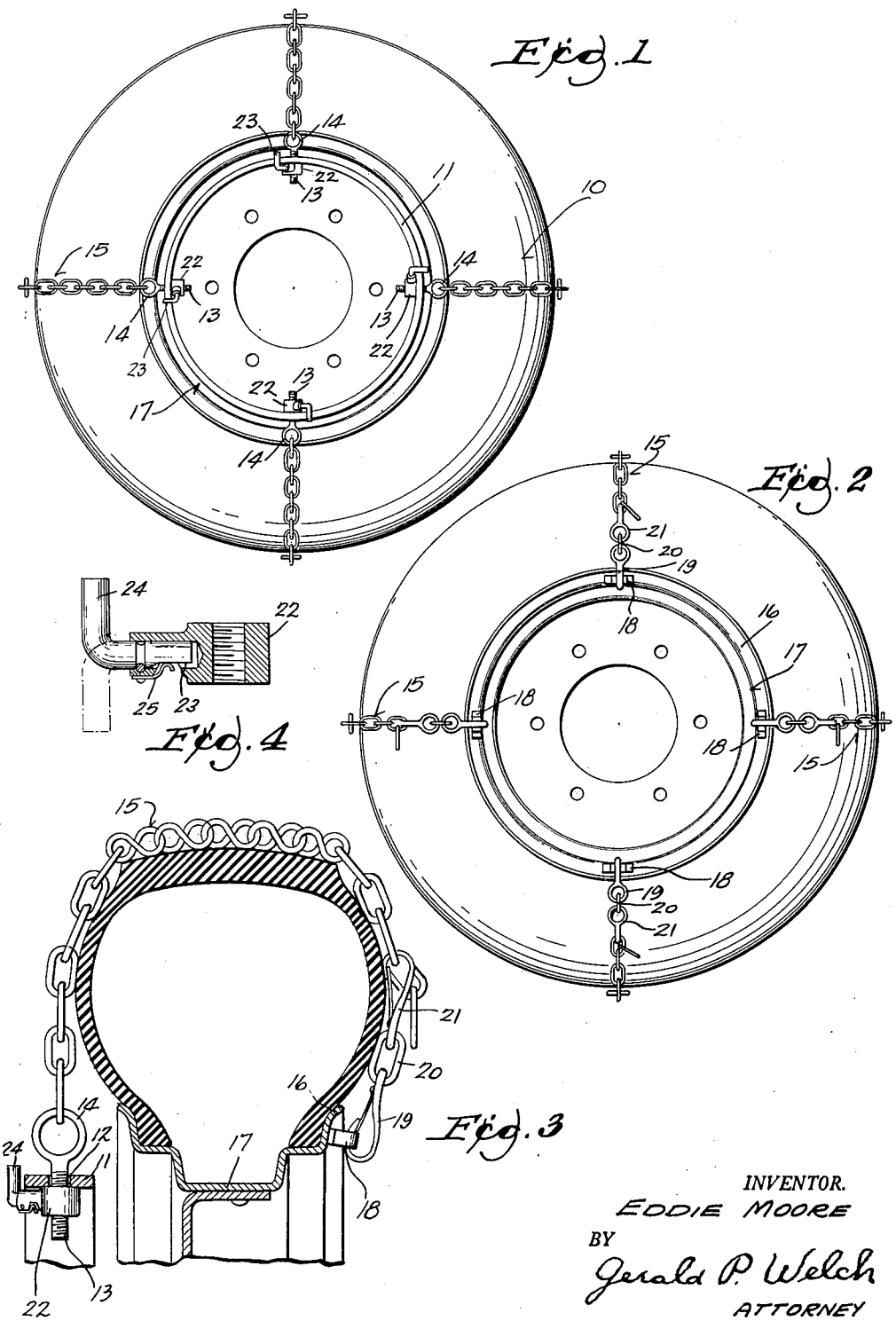
INVENTOR.
EDDIE MOORE
BY
Gerald P. Welch
ATTORNEY United States Patent Office 3,037,543
Patented June 5, 1962

3,037,543
TIRE CHAIN ASSEMBLIES
Eddie Moore, 1316 N. 11th St., Milwaukee, Wis.
Filed Jan. 10, 1961, Ser. No. 81,826
1 Claim. (Cl. 152—233)

This invention relates to improvements in tire chain assemblies, and more particularly to a novel tire chain assembly of a quick demountable type.

An object of the invention is to provide a device of the type which may be quickly attached to a tire and as quickly removed from the same.

Another object of the invention is to provide a device of the type which may be applied to an automotive tire more easily than similar devices of the type now in use.

Other and further objects of the invention will appear as the description proceeds, reference being had to the accompanying drawing, in which:

FIG. 1 is a side view showing a portion of a tire chain assembly embodying the invention.

FIG. 2 is a view of the car side of an automotive tire equipped with said tire chain assembly.

FIG. 3 is a view partly in elevation and partly in section of a tire and rim equipped with one unit of the tire chain assembly.

FIG. 4 is an enlarged view of the bolt securing nut with the locking means secured thereto.

Referring more particularly to the drawing, the numeral 10 refers to the device generally, comprising a circular ring band 11 having a plurality of spaced apertures as at 12 accommodating a plurality of bolts 13 each having an eye 14 engaged with one end of a cross link assembly 15.

The inside periphery 16 of the tire rim 17 has a plurality of metal loops 18 spaced thereon, and these are used to anchor the snap hooks 19 which are engaged by links 20 with snap hooks 21 in turn engaged with the cross links 15.

Each bolt 13 is provided with a nut 22 which has an integral angular lever 23. The segment 24 on lever 23 acts to prevent loss of the nut 22 by bearing against the ring band 11.

It will be understood that the device is capable of many modifications in structure and design without departing from the spirit of the invention, within the scope of the appended claim.

Having thus described the invention, what is claimed and desired to be secured by Letters Patent of the United States is:

In combination with a tire rim, a plurality of eye members spaced about the inner periphery thereof, a ring band adapted for positioning adjacent the outer side of said tire rim having spaced apertures therein, a bolt disposed in each aperture, a nut on each bolt, an angular handle on each nut adapted to bear against the annular ring band, each bolt having an eye in one end thereof, a plurality of cross links, and snap hook means for releasably securing said cross links between each rim eye and said bolt eye.

References Cited in the file of this patent

UNITED STATES PATENTS

| | | |
|---|---|---|
| 1,223,724 | Otto | Apr. 24, 1917 |
| 2,091,171 | Watson | Aug. 24, 1937 |
| 2,746,508 | Doughty | May 22, 1956 |